(12) United States Patent
Mair et al.

(10) Patent No.: US 9,248,733 B2
(45) Date of Patent: Feb. 2, 2016

(54) APPARATUS FOR COOLING ELECTRIC MOTORS

(75) Inventors: Ulrich Mair, Friedrichshafen (DE); Jens Heimann, Stetten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 115 days.

(21) Appl. No.: 14/119,478

(22) PCT Filed: Mar. 20, 2012

(86) PCT No.: PCT/EP2012/054881
§ 371 (c)(1),
(2), (4) Date: Mar. 27, 2014

(87) PCT Pub. No.: WO2012/159797
PCT Pub. Date: Nov. 29, 2012

(65) Prior Publication Data
US 2014/0345959 A1      Nov. 27, 2014

(30) Foreign Application Priority Data

May 25, 2011   (DE) .......................... 10 2011 076 437

(51) Int. Cl.
| | |
|---|---|
| *B60K 11/02* | (2006.01) |
| *H02K 9/19* | (2006.01) |
| *B60K 7/00* | (2006.01) |
| *B60C 23/18* | (2006.01) |
| *B60K 17/356* | (2006.01) |
| *B60K 17/04* | (2006.01) |
| *B60K 11/00* | (2006.01) |

(Continued)

(52) U.S. Cl.
CPC ................ *B60K 11/02* (2013.01); *B60C 23/18* (2013.01); *B60K 1/02* (2013.01); *B60K 7/0007* (2013.01); *B60K 11/00* (2013.01); *B60K 17/043* (2013.01); *B60K 17/356* (2013.01); *H02K 9/19* (2013.01); *B60K 2001/006* (2013.01)

(58) Field of Classification Search
CPC ........... B60K 7/007; B60K 2007/0038; B60K 2007/0092; B60K 2001/003; B60K 11/02; B60K 17/043; B60K 17/356; B60K 1/02; B60K 2007/0061; B60L 2220/46; H02K 9/19; B60C 23/18; B60G 2200/144; B60H 1/00007
See application file for complete search history.

(56) References Cited

U.S. PATENT DOCUMENTS

| | | | | |
|---|---|---|---|---|
| 4,408,809 | A | * | 10/1983 | Walter et al. .................. 384/486 |
| 5,127,485 | A | * | 7/1992 | Wakuta et al. ............. 180/65.51 |
| 5,156,579 | A | * | 10/1992 | Wakuta et al. ................ 475/161 |

(Continued)

FOREIGN PATENT DOCUMENTS

| | | |
|---|---|---|
| CH | 291709 | 6/1953 |
| JP | 2009241911 | 10/2009 |

OTHER PUBLICATIONS

German Patent Office Search Report, Jan. 28, 2012.

(Continued)

*Primary Examiner* — S. Joseph Morano
*Assistant Examiner* — Hilary L Johns
(74) *Attorney, Agent, or Firm* — Dority & Manning, P.A.

(57) ABSTRACT

A device for propelling a vehicle includes at least two electric motors, whereas each of the electric motors is equipped with a cooling device. The cooling device includes at least one cooling fluid line, whereas the cooling fluid lines are connected to the two cooling devices through a common cooling fluid connection line.

9 Claims, 3 Drawing Sheets

(51) Int. Cl.
  *B60K 1/02* (2006.01)
  *B60K 1/00* (2006.01)

(56) References Cited

U.S. PATENT DOCUMENTS

| | | | |
|---|---|---|---|
| 5,345,777 A | | 9/1994 | Sekino et al. |
| 5,632,157 A | * | 5/1997 | Sekino et al. .................... 62/244 |
| 6,139,464 A | * | 10/2000 | Roske ........................... 475/331 |
| 6,651,762 B1 | * | 11/2003 | Hokanson et al. ......... 180/65.51 |
| 8,763,737 B2 | * | 7/2014 | Kellogg ....................... 180/65.6 |
| 8,800,699 B2 | * | 8/2014 | Chodura et al. ........... 180/65.22 |
| 2004/0036245 A1 | * | 2/2004 | Mollhagen ............. 280/124.128 |
| 2006/0158024 A1 | * | 7/2006 | Wendl .......................... 301/137 |
| 2006/0272871 A1 | * | 12/2006 | Murata ........................ 180/65.5 |
| 2011/0042159 A1 | * | 2/2011 | Kellogg ........................ 180/339 |

OTHER PUBLICATIONS

PCT Search Report, Aug. 10, 2012.
PCT International Preliminary Examination Report, Aug. 10, 2012.

* cited by examiner ative layout of the electric motors on a torsion beam is particularly favorable for rear axles.

APPARATUS FOR COOLING ELECTRIC MOTORS

FIELD OF THE INVENTION

The invention is concerned with a device for propelling a vehicle, comprising at least two electric motors, whereas each of the at least two electric motors is equipped with a cooling device that includes at least one cooling fluid line. Furthermore, the present invention is concerned with a vehicle equipped with the electric motors and cooling devices.

BACKGROUND

Increasingly, electric motors are used to propel vehicles. Vehicles in which electric motors provide the propulsion together with motors of other designs, such as internal combustion engines, as well as vehicles in which only electric motors are used for propulsion, are customary.

In the course of further development and the reduced dimensions of the electric motors that this has brought about, it is possible to use, instead of one powerful centrally arranged electric motor, which takes effect on at least one drive axle, several smaller electric motors, such that one electric motor can be assigned to each drive wheel. These electric motors can be placed near the corresponding drive wheel, and the distance over which the force must be transferred from the drive motor to the drive wheel can be kept short.

Since these electric motors also produce heat in addition to the kinetic energy dedicated to propelling the vehicle, it is necessary to cool the motor in order to prevent damage to the motor. Cooling devices are used for cooling. These devices absorb the heat given off by the electric motor and remove such heat from the electric motor. So, for example, a cooling fluid is led to the electric motor by means of a pump; the fluid is warmed up by the electric motor and the waste heat of the electric motor is at least partially absorbed by the fluid. The cooling fluid that is warmed up in such a manner is moved away from the electric motor, and the waste heat is removed from the electric motor and the electric motor is thus cooled.

This prevents the overheating of the motor, and the electric motor can be operated at high capacity over a long period of time.

In order to ensure a controlled supply of the electric motor with cooling fluid, the cooling fluid is typically brought to the electric motor by means of one or more cooling fluid supply lines, and led back into a reservoir by means of a cooling fluid discharge line. From the reservoir, the absorption of the cooling fluid may in turn take place by means of the cooling fluid supply line. Thereby, the cooling of the cooling fluid can take place in the cooling fluid reservoir or in the cooling fluid supply lines or discharge lines. Moreover, a separate cycle for the cooling of the cooling fluid is conceivable. At the electric motor, the cooling fluid is heated by the electric motor. Such cooling devices comprise, for example, a cooling fluid supply line, a cooling fluid discharge line, a cooling fluid pump, a heat exchange area for absorbing the heat from the cooling fluid, and a cooling fluid reservoir to make the cooling fluid available. However, such cooling devices represent an additional weight and require additional space, thus increasing the overall dimensions and overall weight of the drive and thus of the vehicle as a whole.

SUMMARY OF THE INVENTION

A task of the present invention is to make available an electric vehicle drive that requires reduced height and/or features fewer individual components and/or can be produced and/or incorporated more cost-effectively. Additional objects and advantages of the invention will be set forth in part in the following description, or may be obvious from the description, or may be learned through practice of the invention.

The objects of the invention are solved by means of a device according to the appended claims. Preferred embodiments can be found in the following description and claims.

In accordance with aspects of the invention, a device for propelling a vehicle is provided, whereby the device features at least two electric motors, and each of the electric motors is cooled by at least one cooling device with at least one cooling fluid line. Thereby, the cooling fluid lines of the cooling devices are connected through one cooling fluid connection line, through which cooling fluid flows from one cooling fluid line into the other cooling fluid line. Thus, it is possible to, for the cooling of several electric motors, use individual elements together; these can be pumps, cooling fluid lines, and/or cooling fluid reservoirs.

The cooling device features a heat exchange area, in which the heat of the electric motor is transferred to the cooling fluid. Thereby, the heat exchange area may feature one or more cooling lines, which for example span parallel with each other along the electric motor, at least on the side areas of the motor. However, the cooling lines can be arranged at right angles to one another, and/or can run in a net-like manner along the electric motor. It is also possible to create surface structures, such as cavities, in which the cooling fluid flows around the electric motor. Thus, the inner surface of the heat exchange area can be increased by deviating from a circular cross-section. In particular, cooling fins may also be provided; these protrude into the cavity and extend in a longitudinal, lateral or angular manner in the direction of the flow of the cooling liquid. Preferably, the heat exchange area is formed by the electric motor housing.

The use of a single cooling fluid connection line saves weight on the one hand, since using two cooling fluid lines per electric motor for the arranged cooling fluid pump or cooling fluid reservoir, which may be removed, can be dispensed with. In addition, this allows for cooling devices with a smaller solid measure, so that such cooling devices, and thus also the electric motors, can be housed more easily close to the wheels. Moreover, eliminating additional cooling fluid lines reduces the risk that such cooling fluid lines leak, and that sufficient cooling of the electric motors can no longer be provided.

Cooling fluid is understood to comprise any fluid or gas that is suitable for absorbing and transporting heat. Such cooling fluids may include: water, air and/or thermal oil, glycol, etc.

In a particular configuration, preferably, at least two electric motors are arranged on a torsion beam. Thereby, the torsion beam may consist of at least two trailing arms, with a wheel arranged on each, and with a cross beam that connects the two trailing arms to each other. A trailing arm is a component that extends at least roughly parallel to the longitudinal axis of the vehicle, and is flexibly connected to the car body and the wheel. A cross beam is a component that connects the two longitudinal beams, whereas the contact points between the cross beam and the trailing arms are each spaced along the car body. The main direction of propagation of the trailing arm lies parallel to the longitudinal axis of the vehicle; the main direction of propagation of the cross beam is correspondingly arranged crosswise on this. Such torsion beams are particularly used for the rear axle, and allow for easy assembly and disassembly of the whole axle, and have little need for space and only a few components. The arrangement of the electric motors on the torsion beam makes it possible to arrange the electric motors in fixed positions relative to the wheels, such that the spring movement does not give rise to a shift in the position of the drive wheels with regard to the electric motors.

Preferably, the cooling fluid connection line is arranged on the cross beam. Thus, the cross beam that connects the two trailing arms with each other can be connected to the cooling fluid connection line, in order to hold and/or support the cooling fluid connection line. In doing so, less solid, thinner and, in particular, lighter cooling fluid connection lines can be used, resulting in a further weight advantage. In particular, the cooling fluid connection line can be welded, screwed together and/or glued with the cross beam. In particular, the cooling fluid connection line can, at least partially, at least substantially, run parallel to the cross beam.

Moreover, the cooling fluid connection line can be arranged in the cross beam, such that the cross beam at least partially surrounds the cooling fluid connection line. Thus, through the solidly constructed cross beam, the cooling fluid connection line can be protected from damage. Moreover, the cooling fluid connection line can feature less weight, since it is possible to use thinner and thus lighter walls.

In particular, the cooling fluid connection line forms the cross beam, by which separate cooling fluid connection line walls are unnecessary, and thus the cooling fluid connection line can be formed with even less weight.

The cross beam can be made of metal, such as steel, and/or other materials, such as plastic, glass fiber reinforced plastic and/or carbon fiber reinforced plastic. Such materials have a sufficiently high resistance, on the one hand in order to be used as a fluid conductor; on the other hand, these materials allow for a cross beam with a low weight.

In particular, the trailing arms are for the most part formed by the electric motors (e.g., the housing of the electric motors), such that the cross beam is preferably connected to the trailing arms in the area of the housing of the electric motors.

Preferably, the at least two electric motors are equipped with a cooling fluid line, which features a cooling fluid inlet and a cooling fluid outlet. The cooling fluid inlet of the cooling fluid line of one electric motor is connected to the cooling fluid outlet of the cooling fluid line of the other electric motor through the cooling fluid connection line. Thus, the cooling fluid can be introduced through the cooling fluid inlet in the cooling device of the first motor; there, the heat of the electric motor is absorbed, and transported through the cooling fluid outlet into the cooling fluid connection line. From the cooling fluid connection line, the cooling fluid is led into the cooling fluid inlet of the cooling device of the other electric motor. Through the cooling fluid connection line, which at the same time can be constructed as a cross beam, an additional supply line to the second electric motor and a cooling fluid discharge line from the first electric motor need not be used, and thus the number of used components is further reduced. Preferably, the cooling fluid connection line may feature cooling elements for the cooling of the cooling fluid. Such cooling elements can be, on the one hand, active cooling elements such as Peltier elements, and, on the other hand, passive cooling elements such as cooling fins, etc., which are arranged, for example, on the outside of the cooling fluid connection line. The cooling fins can be made of metal, such as steel or copper, such that the heat of the cooling fluid is partially transferred to the air flow. Thus, the cooling fluid in the cooling fluid connection line can be cooled, for example, by the air flow, before it is channeled into the cooling device of the second electric motor. Thus, by means of a corresponding design of the cross beam, a separate cooling device for the cooling of the cooling fluid prior to entry into the heat exchange area of the second electric motor need not be used.

BRIEF DESCRIPTION OF THE DRAWINGS

In addition, the invention is further clarified on the basis of one embodiment using the drawings. The drawings show

DETAILED DESCRIPTION

Figure 1:
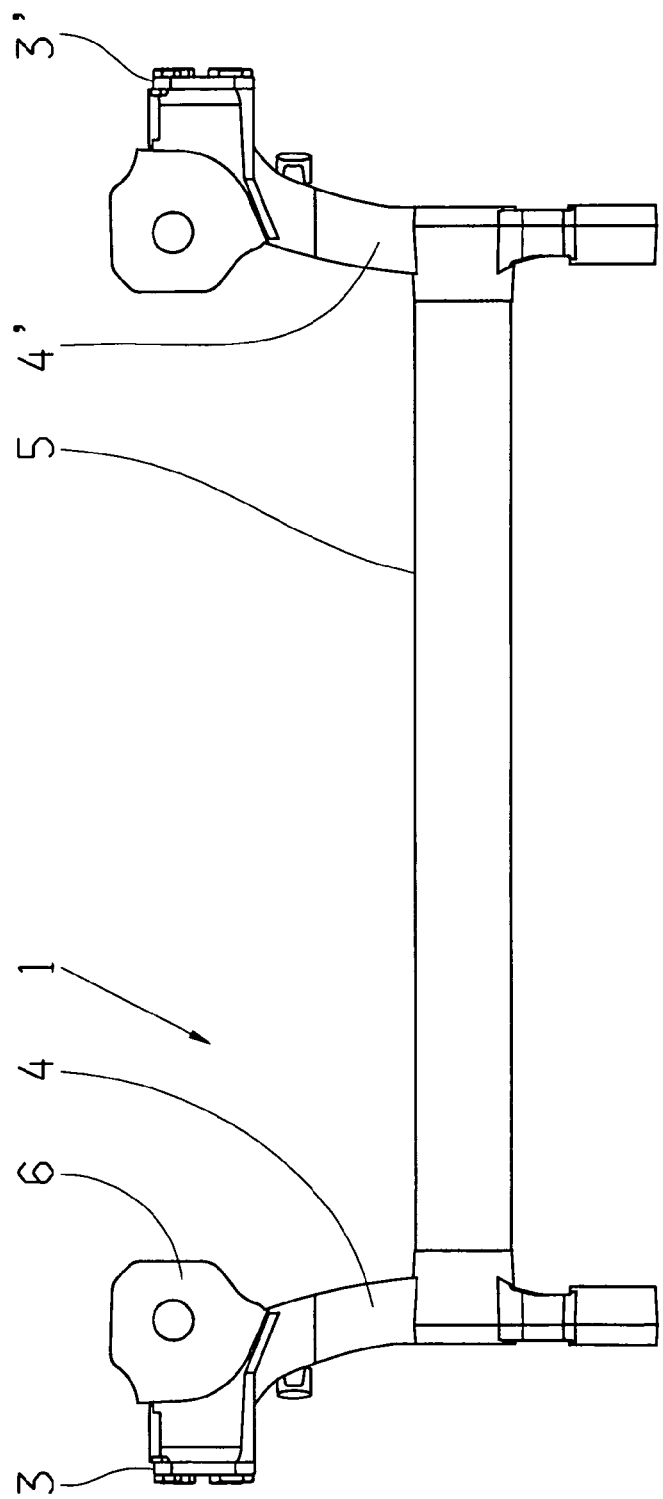
FIG. 1 is a torsion beam according to the state of the art.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a torsion beam 1, as it can be used as the rear axle in small vehicles. The torsion beam 1 connects the two wheels 2, 2' (FIG. 2) and thereby allows the compression of the wheels 2, 2'. The wheels 2 are thereby rotatably attached to the trailing arms 4. Further, the torsion beam 1 comprises a cross beam 5, which connects the two trailing arms 4, 4' to each other, and thus stabilizes the wheel position. The cross beam 5 is thereby enclosed in nearly a right angle to the longitudinal beams of the trailing arm 4, 4', and features a main direction of propagation that is at a right angle to the main direction of propagation of the main axis of the vehicle. The cross beam 5 is thereby connected to the trailing arms 4, 4', spaced from the car body. Spaced from the connection point between the cross beam 5 and the respective trailing arm 4, 4', a connection point 6 for the spring 7 and the damper 3 is provided on each trailing arm 4, 4'. The cross arm can be screwed together, glued or welded with the trailing arms. For this purpose, the trailing arms 4, 4' feature a connection area, which forms a particularly flat surface to which the cross arms can be attached.

Preferably, instead of the flat surface for connecting with the cross arms, the trailing arms 4, 4' may feature a multiple-surface contour, for example in order to allow for a multiple component connection, synchronization gearing, a shaft groove connection and the like.

Figure 2:
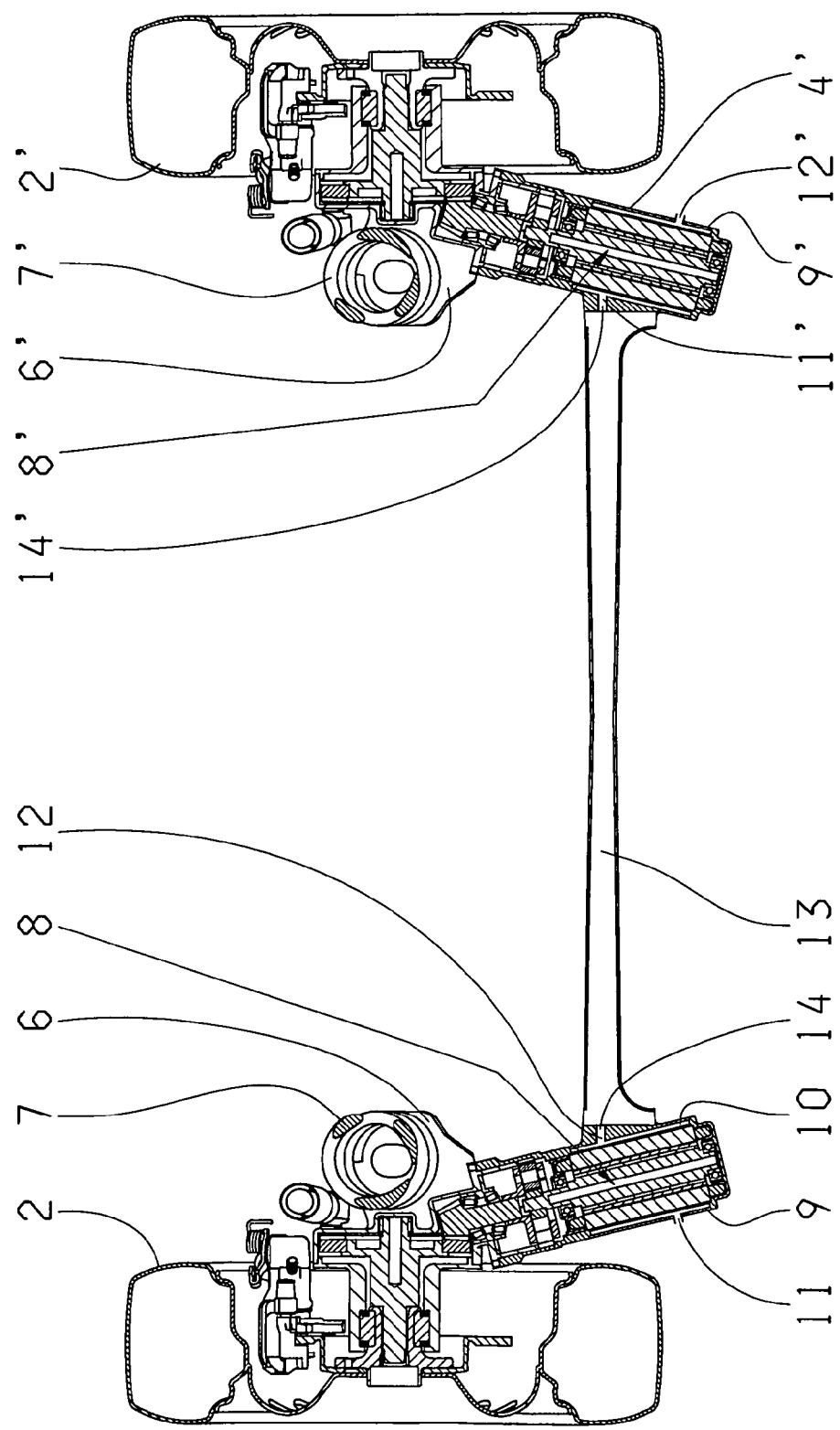
FIG. 2 is a torsion beam with electric motors arranged thereon.

As shown in FIG. 2, an electric motor 8 or 8' is intended for each trailing arm 4 or 4', with each electrical motor equipped with a cooling housing 9, 9'. The cooling housing 9 surrounds the electric motor 8 on the side, and features at least one cooling line 10, which is equipped with a cooling fluid inlet 11 and a cooling fluid outlet 12. In the cooling fluid inlet 11 of the electric motor housing 9, cooling fluid is pumped from a pump in the cooling fluid line 10 of the cooling housing 9. There, the cooling fluid absorbs the heat of the electric motor, and leaves the housing 9 through the cooling fluid outlet 12 in the cross beam 5 by means of the cooling fluid connection line 13. For this purpose, the cross beam 5 on its front side features an opening, which is connected to a fluid line running in the center of the cross beam 5, and ends in an opening 14' likewise arranged on the front side on the other side of the cross beam 5. The opening 14' is connected to the cooling fluid inlet 11' of the housing 10' of the electric motor 9', such that, through the cooling fluid connection line, cooling fluid can arrive in the cooling fluid line of the electric motor housing 10'. There, the cooling fluid absorbs the heat of the electric motor 9', and leaves the housing of the electric motor 8' through the cooling fluid outlet 12'. Through a cooling fluid line, the cooling fluid further arrives at a reservoir and/or a pump, which are not shown here.

Figure 3:
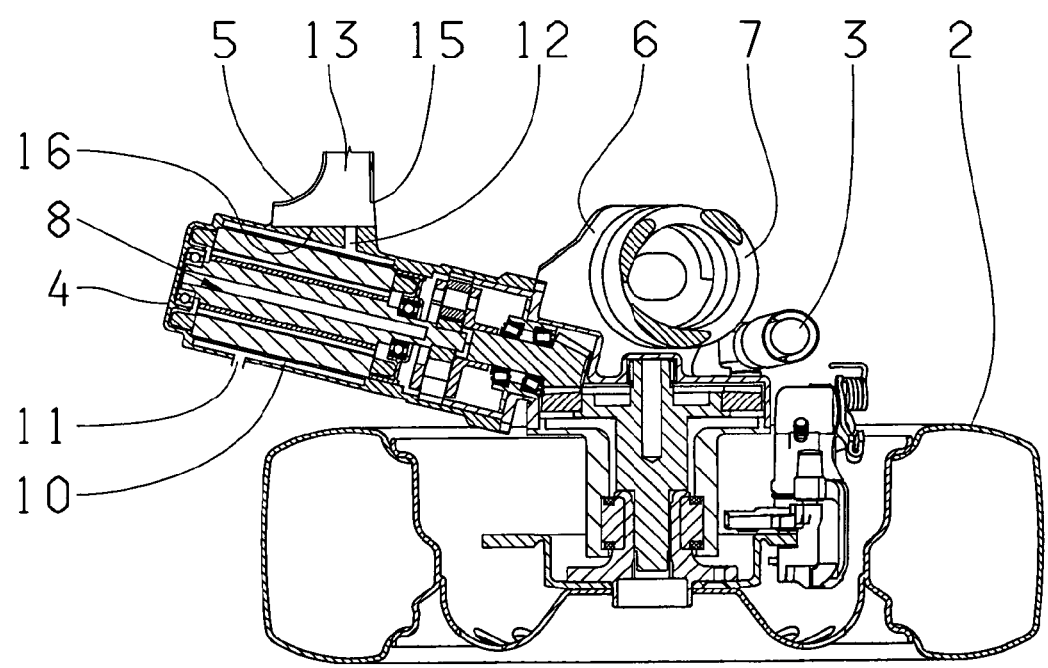
FIG. 3 is a partial cut of a torsion beam according to FIG. 2 in cross-section.

The cooling device of the electric motor 9 is shown in more detail in FIG. 3. FIG. 3 shows a trailing arm 4, in which an electric motor 8 is arranged. Thereby, the electric motor 8 is attached lengthwise in the longitudinal beam of the trailing arm 4, and propels the wheel 2 through a bevel gear. A housing 9 is located around the electric motor 8; this encloses the electric motor 8 at least on the side, and forms large parts of the trailing arm 4. Thereby, the housing 9 is made of a material that conducts heat well, such as metal, such that the heat of the electric motor is absorbed by the housing. Fluid lines 10 are arranged in the housing 9; cooling fluid flows into these lines 10. Thus, the heat that is absorbed by the housing can be further transferred to the cooling fluid. The fluid lines 10 can take on many forms. Here, they are drawn in tube-shaped form in the cross section.

The fluid lines 10 thereby feature a common cooling fluid inlet 11 and cooling fluid outlet 12. At the cooling fluid inlet 11, cooling fluid may flow into the fluid line 10, and may be conducted through the fluid line 10 into the housing 9 near the electric motor 8. At the side of the trailing arm 4 turned away from the wheel, the fluid line 10 leaves the housing 9 through the cooling fluid outlet 12, which is inserted into a socket for the cross beam 5. The cooling fluid outlet 12 is likewise in tube-shaped form, and is connected to the fluid line 10. The cooling fluid outlet 12 channels the coolant heated by the electric motor 8 to the coolant fluid connection line 13. The coolant fluid connection line 13 is integrated into the cross beam 5, and runs in the center of the cross beam 5 along the main direction of propagation of the cross beam 5. The cross beam 5 features a straight front surface 15, which is connected to a mounting surface 16 of the longitudinal beam 4. Thereby, the two surfaces may be glued, screwed together and/or welded with one another.

Moreover, the cross beam may be connected to the trailing arm with a polygon, multiple and/or synchronization gearing. A shaft-hub connection is also possible.

The longitudinal beam of the trailing arm 4 also features a mounting surface 16, on which a spring 7 and a damper 6 is arranged for the dampening of the vertical wheel movement.

Modifications and variations can be made to the embodiments illustrated or described herein without departing from the scope and spirit of the invention as set forth in the appended claims.

The invention claimed is:

1. A device for propelling a vehicle, comprising:
    two electric motors, wherein each electric motor is configured for propelling a respective wheel of the vehicle;
    a cooling device configured with each electric motor;
    each cooling device comprising at least one cooling fluid line;
    each of the cooling fluid lines connected to a common cooling fluid connection line;
    the cooling device further comprising a housing around each electric motor, the cooling fluid lines defined within the housing and including a cooling fluid inlet and a cooling fluid outlet in each housing;
    the cooling fluid connection line connected directly to the cooling fluid outlet of one of the housings and directly to the cooling fluid inlet of the other respective housing; and
    wherein a cooling fluid recirculation path is established by which the cooling fluid runs from a pump or reservoir to the cooling fluid inlet of a one the housings, through the fluid cooling line within the first housing, out of the cooling fluid outlet of the first housing, through the cooling fluid connection line, into the cooling fluid inlet of the second housing, through the fluid cooling line within the second housing, out of the cooling fluid outlet of the second housing, and back to the pump or reservoir.

2. The device as in claim 1, wherein each of the electric motors is arranged on a torsion beam.

3. The device as in claim 2, wherein the torsion beam comprises a trailing arms at each opposite end of the torsion beam, each of the electric motors mounted on a respective one of the trailing arms, the torsion beam further comprising a cross beam interconnecting the trailing arms, the cooling fluid connection line configured with the cross beam; and the trailing arms extending radially outward from the cross beam.

4. The device as in claim 3, wherein the cooling fluid connection line is arranged within the cross beam.

5. The device as in claim 4, wherein the cooling fluid connection line formed by the cross beam.

6. The device as in claim 3, wherein the cross beam comprises cooling elements configured therewith for cooling the cooling fluid passing through the cooling fluid connection line.

7. The device as in claim 6, wherein the cooling elements are configured such that air flow across the cooling elements cools the cooling fluid.

8. The device as in claim 7, wherein the torsion beam comprises a trailing arms at each opposite end of the torsion beam, each of the electric motors mounted on a respective one of the trailing arms, the torsion beam further comprising a cross beam interconnecting the trailing arms, the cooling fluid connection line configured with the cross beam.

9. A vehicle, comprising:
    a device for propelling the vehicle, wherein the propelling device further comprises:
        two electric motors, wherein each electric motor is configured for propelling a respective wheel of the vehicle;
        a cooling device configured with each electric motor;
    each cooling device comprising at least one cooling fluid line;
    each of the cooling fluid lines connected to a common cooling fluid connection line;
    the cooling device further comprising a housing around each electric motor, the cooling fluid lines defined within the housing and including a cooling fluid inlet and a cooling fluid outlet in each housing;
    the cooling fluid connection line connected directly to the cooling fluid outlet of one of the housings and direct to the cooling fluid inlet of the other respective housing; and
    wherein a cooling fluid recirculation path is established by which the cooling fluid runs from a pump or reservoir to the cooling fluid inlet of a one the housings, through the fluid cooling line within the first housing, out of the cooling fluid outlet of the first housing, through the cooling fluid connection line, into the cooling fluid inlet of the second housing, through the fluid cooling line within the second housing, out of the cooling fluid outlet of the second housing, and back to the pump or reservoir.

* * * * *